US008459188B2

United States Patent
Miller et al.

(10) Patent No.: US 8,459,188 B2
(45) Date of Patent: Jun. 11, 2013

(54) MAGNETIC LEVITATION TRAIN PROVIDED WITH A CONTACTLESS INDUCTIVE TRANSMISSION DEVICE FOR A MAGNETIC LEVITATION VEHICLE RAILWAY

(75) Inventors: Luitpold Miller, Ottobrunn (DE); Friedrich Loeser, Riemerling (DE)

(73) Assignee: Thyssenkrupp Transrapid GmbH, Kassel (DE)

( * ) Notice: Subject to any disclaimer, the term of this patent is extended or adjusted under 35 U.S.C. 154(b) by 687 days.

(21) Appl. No.: 10/592,817

(22) PCT Filed: Mar. 12, 2005

(86) PCT No.: PCT/DE2005/000457
§ 371 (c)(1),
(2), (4) Date: Oct. 3, 2008

(87) PCT Pub. No.: WO2005/091476
PCT Pub. Date: Sep. 29, 2005

(65) Prior Publication Data
US 2009/0205531 A1 Aug. 20, 2009

(30) Foreign Application Priority Data

Mar. 19, 2004 (DE) .......................... 10 2004 013 996
Apr. 13, 2004 (DE) .......................... 10 2004 018 308

(51) Int. Cl.
*B60L 13/04* (2006.01)
*B60L 9/00* (2006.01)

(52) U.S. Cl.
USPC ........................................... 104/281; 191/10

(58) Field of Classification Search
USPC .... 104/281, 282, 286, 288, 290–292; 191/10; 246/194; 310/12.09
See application file for complete search history.

(56) References Cited

U.S. PATENT DOCUMENTS

| 3,863,574 A | 2/1975 | Thomas |
| 4,636,667 A | 1/1987 | Holzinger et al. |
| 4,698,895 A | 10/1987 | Miller et al. |

(Continued)

FOREIGN PATENT DOCUMENTS

| CA | 1 190 618 | 7/1985 |
| DE | 2 306 292 | 8/1974 |

(Continued)

OTHER PUBLICATIONS

Gert Schwindt: "Die Systemtechnik Des . . . " In Zevrail Glasers Annalen—Sonderheft Transrapid, 2003, pp. 34-67 (With English Abstract).

(Continued)

*Primary Examiner* — S. Joseph Morano
*Assistant Examiner* — Zachary Kuhfuss
(74) *Attorney, Agent, or Firm* — Michael J. Striker

(57) ABSTRACT

A magnetic levitation railway is described which comprises a guideway, at least one magnetic levitation vehicle and a device for contactless, inductive transmission of electrical energy from said guideway to said vehicle. According to the invention the device comprises at least two receiver coils (27*a*, 27*b*) being formed by conductor windings and mounted on the vehicle and at least one primary conductor extending in the longitudinal direction of the guideway and being connected to a high-frequency alternating voltage source. The two receiver coils (27*a*, 27*b*) are assigned either jointly to the same primary conductor or individually to one of two primary conductors each (FIG. 4).

8 Claims, 3 Drawing Sheets

U.S. PATENT DOCUMENTS

| | | | |
|---|---|---|---|
| 5,467,718 A | * | 11/1995 | Shibata et al. ............... 104/284 |
| 5,904,101 A | | 5/1999 | Kuznetsov |
| 6,397,990 B1 | * | 6/2002 | Brien et al. .................. 191/10 |
| 6,629,358 B2 | | 10/2003 | Setiabudi et al. |
| 6,651,566 B2 | * | 11/2003 | Stephan et al. ............... 104/288 |

FOREIGN PATENT DOCUMENTS

| | | |
|---|---|---|
| DE | 32 37 373 | 5/1983 |
| DE | 34 10 119 | 10/1985 |
| DE | 39 28 277 | 12/1990 |
| WO | 97/30504 | 8/1997 |

OTHER PUBLICATIONS

Karsten Blank et al: "Antrieb Und Energieversorgungs Des . . . " In Zevrail Glasers Annalen—Sonderheft Transrapid, 2003, pp. 70-87 (With English Abstract).

* cited by examiner

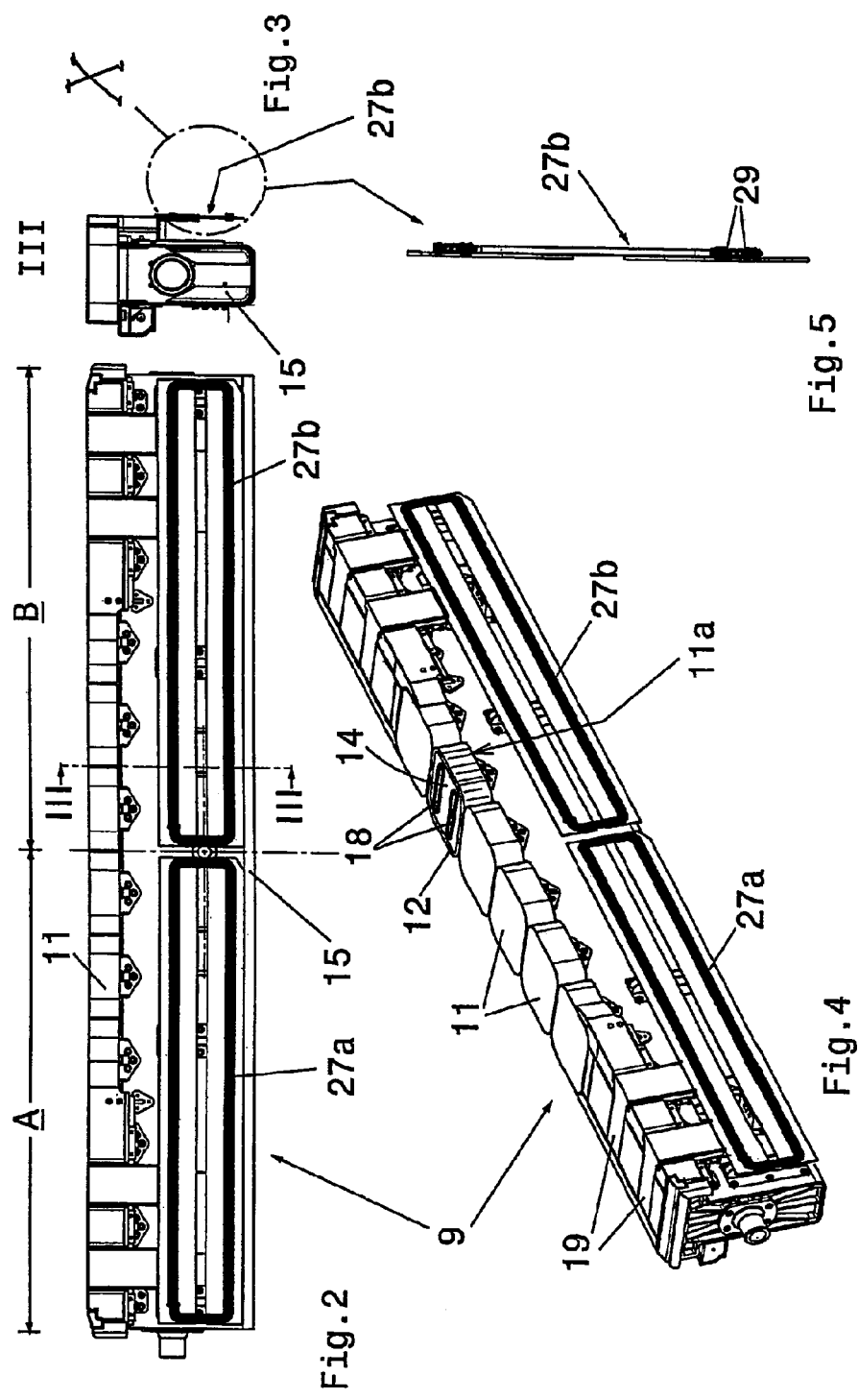

MAGNETIC LEVITATION TRAIN PROVIDED WITH A CONTACTLESS INDUCTIVE TRANSMISSION DEVICE FOR A MAGNETIC LEVITATION VEHICLE RAILWAY

The invention relates to a magnetic levitation railway of the species mentioned in the preamble of claim 1.

The on-board energy of usual magnetic levitation vehicles is usually generated in a contactless manner by the aid of linear generators which are integrated into the magnet poles of at least one magnet arrangement destined for carrying and/or guiding the magnetic levitation vehicle and which, for example, co-act with a long stator (e.g. DE 34 10 119 A1). The transmission of energy depends on the speed of the magnetic levitation vehicle which is the reason why prior art devices cover the full energy demand of the magnetic levitation vehicle, necessary e.g. for the functions "carrying", "guiding", and "braking", only from speeds of approximately 100 km/h on. Therefore, additional energy sources are required where the speed of a magnetic levitation vehicle is less or zero (e.g. in railway stations). This includes powerful batteries carried along in the magnetic levitation vehicle on the one hand and external means on the other hand, e.g. contact rails laid along slow speed sections of the track, to which contact rails current collectors mounted on the magnetic levitation vehicle are assigned to. The latter might make it necessary to stop the magnetic levitation vehicle in case of operating failures only where such an external power supply is available. Moreover, the financial expenditure on such devices is comparably substantial. Finally, these devices require constant maintenance due to discharging procedures in the batteries or due to mechanical wear and tear, so that they do not work with adequate safety. A failsafe onboard energy supply is therefore not ensured even if several redundant onboard networks are provided for in the magnetic levitation vehicle.

A particular interference with the energy supply as described above is caused by the buffer batteries. In terms of their volume, weight, cost and maintenance expenditure they entail substantial drawbacks that have an adverse effect on economic efficiency in particular.

Besides, it is generally known for traffic systems to provide a contactless transmission of energy from the guideway to a vehicle by the aid of conductor loops which are mounted to the guideway, to which high-frequent alternating voltages are applied and to which a pick-up loop mounted on the vehicle is assigned serving for coupling out the energy. A safe supply of energy by these means alone has not been possible up to now.

Therefore, the technical problem underlying the present invention is to provide a magnetic levitation railway with a largely failsafe energy (power) supply unit which in particular makes it possible to operate without hitherto unavoidable buffer batteries in the vehicles and even without additional linear generators or the like, if required.

The characteristic features outlined in claim 1 serve to solve this problem.

The invention proceeds from the idea of providing the device for contactless power transmission with electronically working means instead of linear generators or even in addition to the latter, which means ensure an adequate transmission of energy from the guideway to the vehicle in those track sections where the demand for onboard energy cannot be covered or not completely be covered through linear generators or other means. These means are not only effective at slow speeds and even during a standstill of the magnetic levitation vehicles, but they are also redundant, which is the reason why one can completely dispense with alternative measures, e.g. buffer batteries in the vehicles, power rails along the guideway or the like. The desired redundancy can in principle be rated at any optional level without thereby substantially increasing the volume, weight, cost and maintenance expenditure in the vehicle.

Other advantageous features of the present invention become evident from the subclaims.

The invention is explained in greater detail as set forth below by means of an embodiment and based on the drawings enclosed hereto, wherein:

FIG. 1 schematically shows a partial section through a usual magnetic levitation vehicle in the area of a guideway provided with a long stator;

FIG. 2 shows the front view of a magnet arrangement with a receiver (pick-up) coil for the contactless energy transmission, viewed from the side of a guideway beam;

FIG. 3 shows a section along line III-III of FIG. 2;

FIG. 4 shows a perspective front view of the magnet arrangement as per FIG. 2;

FIG. 5 shows a magnified detail X of FIG. 4; and

Figure 1:
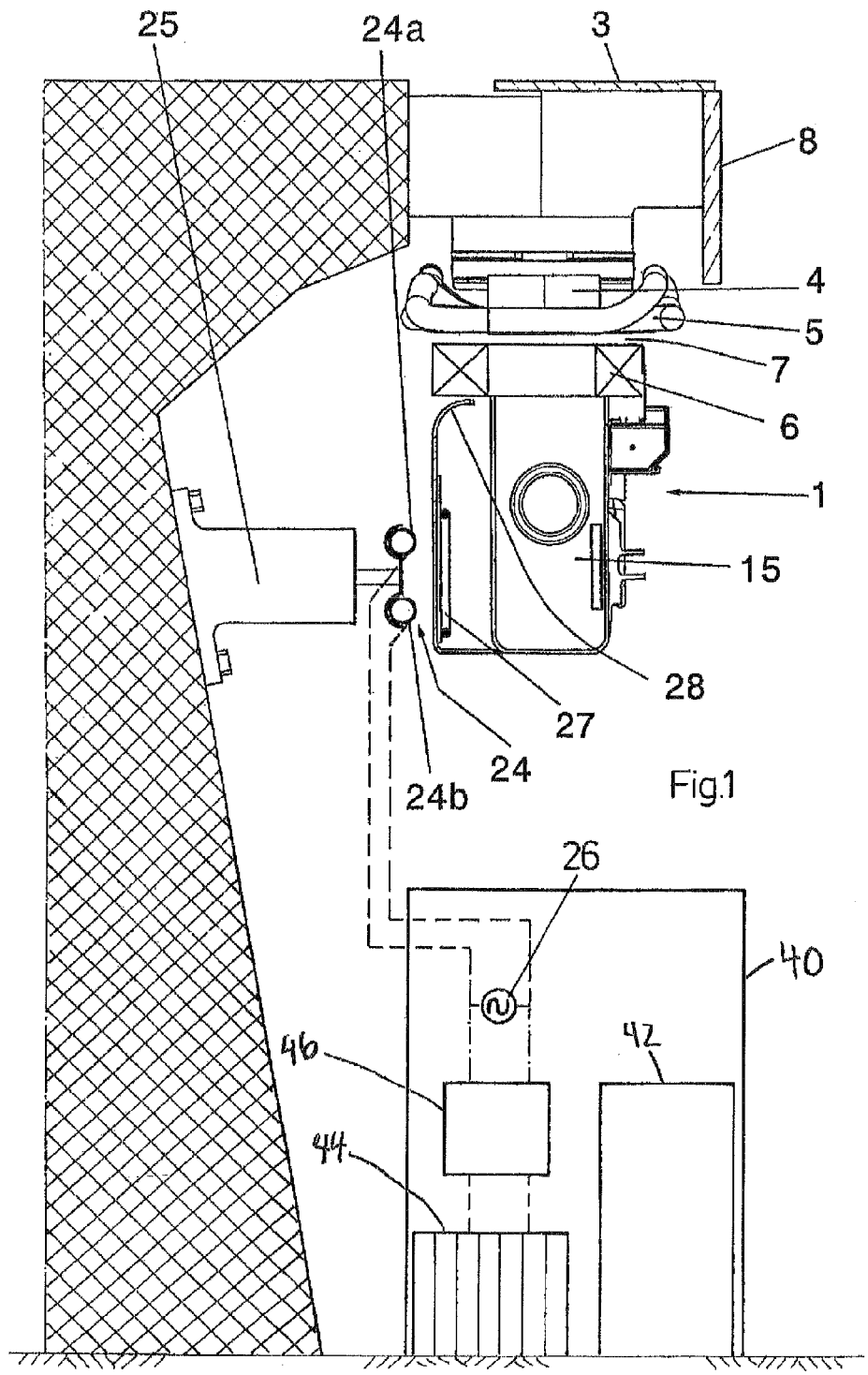

FIG. 1 schematically shows a cross-section through a magnetic levitation railway with a magnetic levitation vehicle 1 which is conventionally movably mounted on a guideway extending in longitudinal direction of a route, said guideway being comprised of supports 2 made of steel and/or concrete as well as guideway plates 3 mounted on it. The propulsion of the magnetic levitation vehicle 1 is effected, for example, by a long stator motor which comprises stator packets 4 affixed underneath said guideway plate 3 and arranged consecutively in the longitudinal direction thereof. The stator packs 4 have alternatingly succeeding teeth and grooves, not shown here, into which windings 5 are inserted that are fed with three-phase current of a variable amplitude and frequency. The actual excitation field of the long stator motor is generated by at least one carrying magnet 6 which is affixed to said magnetic levitation vehicle 1 in a manner not shown here in detail and which comprises magnet poles facing the downwardly open grooves of stator packets 4 as shown in FIG. 1. The carrying magnet 6 not only provides the excitation field, but also fulfils the function of carrying and levitating by maintaining a given support gap 7 of e.g. 10 mm between itself and said stator packs 4 during operation of the magnetic levitation vehicle 1.

For a proper guidance of the magnetic levitation vehicle 1 on the track, the guideway plates 3 are provided with laterally affixed guide rails 8, which are faced by guiding magnets 9 also mounted to the vehicle 1 and serving for maintaining a gap corresponding to gap 7 between itself and the guiding rail 8 during operation of the vehicle.

According to FIG. 2 to FIG. 5, the carrying magnet 6 shown in FIG. 1 forms a module fastened to vehicle 1 and having a magnet arrangement 9 for the "carrying" function. However, it is obvious that a plurality of such modules can be mounted at the magnetic levitation vehicle 1 in lateral arrangement side by side and one behind the other, viewed in the direction of travel.

The magnet arrangement 9 comprises e.g. twelve magnet poles 11 arranged one behind the other, whose windings 12 and cores 14 electrically connected in series as schematically indicated in FIG. 4 for one of said magnet poles 11a are usually surrounded by a protection against corrosion in form of a cast resin layer or the like. The cores 14 of the individual magnet poles 11 are connected to each other by pole backs not shown here and affixed by pole cheeks not shown here either as well as by rods penetrating through these pole cheeks to a magnet back box 15 of the magnet arrangement 9.

Magnetic levitation vehicles 1 and their magnet arrangements are generally known to an expert, e.g. through printed publications U.S. Pat. No. 4,698,895, DE 39 28 277 C1, PCT WO 97/30504 A1, and ZEVrail Glasers Annalen, special edition Transrapid October 2003, pages 34 to 87 which for the sake of simplicity are made a part of the present disclosure by reference.

Figure 6:
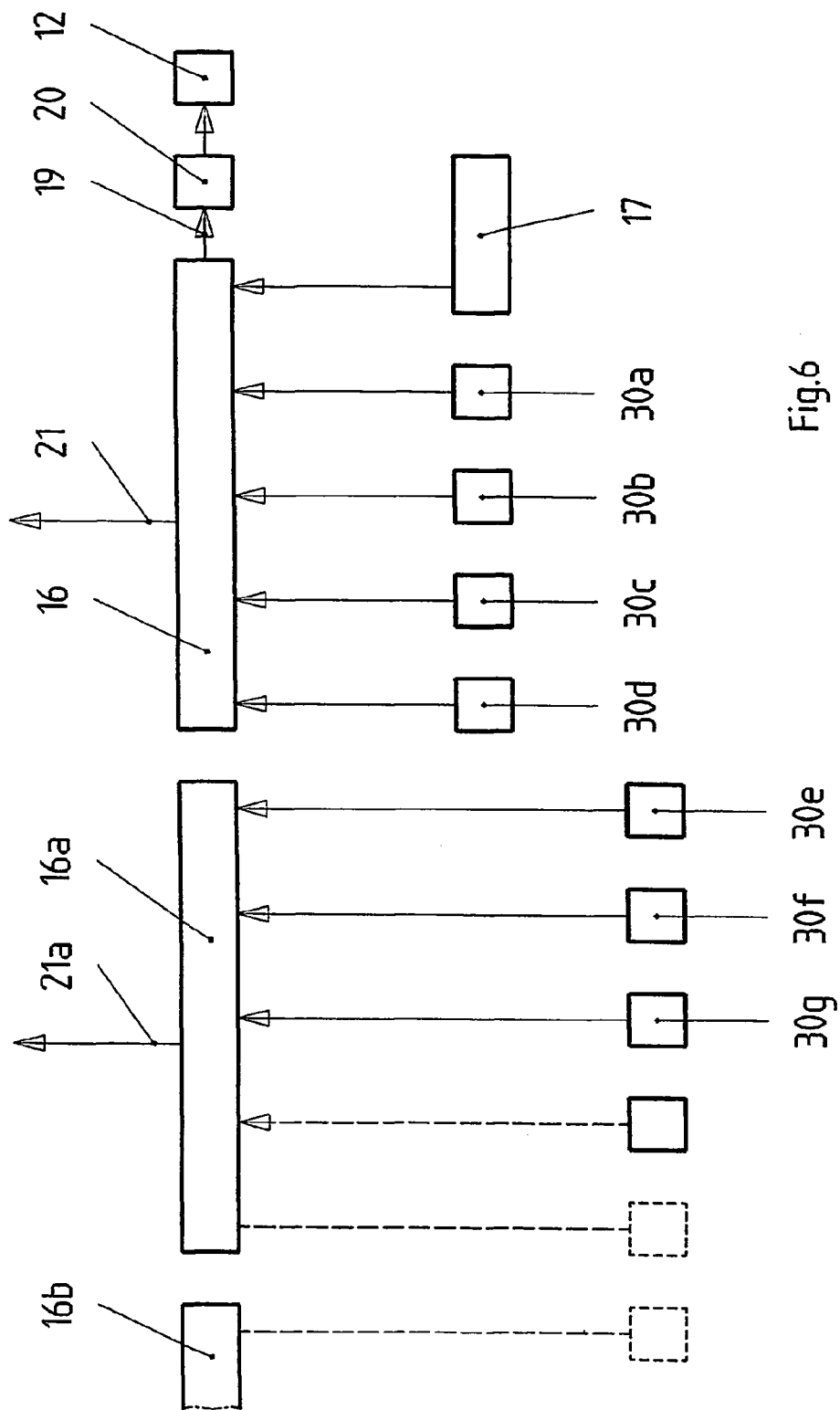
FIG. 6 shows a block diagram for an onboard power supply according to the invention.

A power supply unit schematically shown in FIG. 6 by way of a block-type circuit diagram serves for supplying electrical energy to magnetic levitation vehicle 1. Therein, block 16 designates an onboard network that supplies energy to various electrical facilities of the vehicle. The onboard network 16 itself is supplied with the required operating voltage by at least one linear generator 17. The linear generator 17 comprises windings 18 which are arranged in at least one magnet pole (e.g. 11a in FIG. 4) and which, in combination with the long stator, supply an alternating voltage, e.g. up to 300 V, depending on the speed of vehicle 1. For example, this voltage is converted in a voltage transformer (converter) comprised of a step-up chopper to a direct operating voltage of e.g. 440 V of the onboard network 16 which supplies said voltage via the network 16 on the one hand to a controller 20 for the windings 12 of magnet poles 9, e.g. by means of a conductor line 19, and on the other hand through a conductor line 21 to other consumers in the magnetic levitation vehicle 1.

Generating on-board energy by the aid of linear generators 17 works only in those track sections where the speed of the magnetic levitation vehicle 1 achieves a certain minimum value. In other track sections, the energy is therefore generated by the aid of contact rails laid at the track and to which mechanical or mechanical-pneumatic current collectors are assigned to.

Since contact rails and mechanical current collectors are not always desired because of their propensity to wear and tear, particularly at high speeds, the invention provides for effecting the transmission of energy from the guideway 2, 3 to the magnetic levitation vehicle 1 additionally through means shown in FIG. 1 to FIG. 5.

For example, according to FIG. 1, a primary conductor 24 designed and built as a transmitter coil or conductor loop, respectively, is provided at a position of the guideway where the contact rail for the power collector has hitherto been arranged and preferably comprises line sections 24a, 24b running to and fro and expediently extending over the entire length of said guideway 2, 3. The two line sections 24a, 24b are fastened to the support 2 e.g. by means of holders 25 comprised of isolators. The primary conductor 24 moreover is preferably connected with a high-frequency voltage source 26, e.g. 300 V to 500 V at 20 kHz to 200 kHz, which is only shown schematically.

Instead of the power collector, a receiver or pick-up coil 27 is mounted at the magnetic levitation vehicle 1. It is preferably so configured that it does not encompass the primary conductor 24, but stands opposite to it at a small distance. Thereby it is possible to accommodate the receiver coil 27 in the magnet back box 15 within a covering 28 which covers box 15 and consists of an electrically isolating material.

According to a particularly preferred embodiment example, the holders 25 are of such a hinged configuration that the primary conductor 24 is mounted in such a manner that it can be folded to the top or to the bottom at support 2 and can be swung off section-wise. It can be avoided thereby that the primary conductor 24 must be fully dismantled during a work to which it poses an obstacle.

FIG. 2 to 4 show that the magnet arrangement 9 comprises two pick-up coils 27a and 27b which are assigned to one half-magnet A or B each. Both pick-up coils 27a, 27b are preferably isolated electrically from each other and are therefore jointly assigned to the primary conductor 24 in such a manner that both of them contribute to the transmission of energy each for itself.

Each receiver coil 27a, 27b illustrated by a thick line in FIG. 2 and FIG. 4 preferably consists of a plurality of parallel conductors 29 (FIG. 5) that form a conductor loop which is so arranged relatively to the primary conductor 24 that it is penetrated by the concentric magnetic field lines generated by line sections 24a, 24b and that it is able to couple out at its connection ends not shown the approximately 300 V voltage supplied by the primary conductor 24. Each two connection ends can be connected to a voltage converter not shown which is combined in FIG. 6 with the respective pick-up coils 27a, 27b to form one block 30a, 30b each. The voltage coupled out and rectified is supplied to the onboard network 16.

The receiver coils 27, 27a, and 27b are preferably manufactured as a pre-fabricated modular group together with the necessary contact elements, e.g. plug connectors, and so mounted at the magnet back box 15 or the covering 28 that they form integral parts of the autonomous module formed by magnet arrangement 9.

The invention is not limited to the described embodiment that can be diversified in a plurality of ways. In particular this applies to the number of receiver coils 27 totally existing per magnetic levitation vehicle and to the number of primary conductors 24 existing at the guideway and connected to a separate high-frequency voltage source 26, each. It is considered expedient to install the voltage sources 26, in the usual known substructures 40 which are mounted in spaced relationship along the guideway 2, 3, and which for example accommodate the inverters 42 and the like needed to feed the long-stator windings. Simple lead-acid storage batteries 44, referred to interchangeably herein as buffer batteries are connected and/or connectable to the primary conductors 24, and are expediently arranged in the same substructures 40 to serve as buffer batteries in case of emergency or the like. DC/AC converters 46 covert the direct current (DC) from the buffer batteries 44 to alternating current (AC) to supply the high frequency voltage source 26 in each substructure 40. Moreover, for the sake of redundancy, it is particularly advantageous to provide two or more separated onboard networks 16, 16a and/or 16b in each magnetic levitation vehicle that are connected to at least one separate receiver coil 27 each as is intended to be indicatively shown by way of further blocks 30e, 30f and 30g in FIG. 6. Finally, it is self-explanatory that the different features can also be applied in combinations other than those described and shown hereinabove.

Parts 24, 27 in FIG. 1 are only shown on the right side of the magnetic levitation railway. In fact, however, it makes sense to provide the same arrangement on the left side of the magnetic levitation railway so as to double the redundancy. This is also indicatively shown in FIG. 6 by two additional blocks 30c and 30d.

A further increase in redundancy is obtained, if the receiver coils 27a, 27b shown in FIG. 2 to 4 do not work jointly at the same primary conductor, but are individually assigned to a separate primary conductor connected to one high-frequency voltage source each. For example, this can be accomplished by arranging the two receiver coils 27a, 27b in FIG. 2 and FIG. 4 one above the other in two winding levels rather than side by side. In this case, two separate primary conductors 24 would be provided for in FIG. 1 and arranged one above the other at a distance that corresponds to the distance of the two winding levels. If the same arrangement is also taken on the other side of the vehicle, the redundancy would be quadrupled with regard to the primary conductor 24 and at least octupled with regard to receiver coils 27a, 27b. The functions being relevant for a safe and secure operation can therefore be safely realized throughout the service life.

The redundancy with regard to the receiver coils 27 can still be increased substantially with usual magnetic levitation vehicles, because they usually are provided with a plurality of magnet arrangements 9, which all can be provided with receiver coils 27 in the manner described above. Thereby it can be ensured that buffer batteries for the onboard network 16 become superflous and can simply be omitted. An emergency power supply, if required, could then be assured by simple lead storage batteries arranged on the guideway side.

Besides, the primary conductors 24 expediently extend over the entire length of the guideway. In this case, the magnetic levitation vehicles can be stopped in any area of the guideway, regardless of the function of the linear generators. It follows therefrom that it would be possible to entirely dispense with the vehicle batteries as well as with the linear generators or the like, provided the design is correct and redundancy of the energy supply according to this invention is sufficient, thus reducing the expenditure on installation required in the vehicles substantially as corresponds to the an embodiment of the invention currently considered to be the best one.

The invention is not limited to the described embodiment that can be diversified in a plurality of ways. In particular this applies to the number of receiver coils 27 totally existing per magnetic levitation vehicle and to the number of primary conductors 24 existing at the guideway and connected to a separate high-frequency voltage source each. It is considered expedient to install the voltage sources in the usual substructures which are mounted in spaced relationship along the guideway and which for example accommodate the inverters and the like needed to feed the long-stator windings. Simple lead-acid storage batteries connected and/or connectable to the primary conductors 24 are expediently arranged in the same substructures to serve as buffer batteries in case of emergency or the like. Moreover, for the sake of redundancy, it is particularly advantageous to provide two or more separated onboard networks 16, 16a and/or 16b in each magnetic levitation vehicle that are connected to at least one separate receiver coil 27 each as is intended to be indicatively shown by way of further blocks 30e, 30f and 30g in FIG. 6. Finally, it is self-explanatory that the different features can also be applied in combinations other than those described and shown hereinabove.

The invention claimed is:

1. A magnetic levitation railway comprising a guideway (2, 3), at least one magnetic levitation vehicle (1) provided with carrying magnets (6) and a device for contactless, inductive transmission of electrical energy from said guideway (2, 3) to said vehicle (1), wherein said device comprises several receiver coils (27a, 27b) formed by conductor windings and mounted at the carrying magnets (6) in pairs of two receiver coils (27a, 27b) one after the other in the longitudinal direction and at least two primary conductors (24) extending in the longitudinal direction of and mounted at the guideway and connected to a high-frequency alternating voltage source (26), wherein at least two of said several receiver coils (27a, 27b) mounted at said vehicle (1) are assigned to each primary conductor of the at least two primary conductors (24), and wherein the vehicle is provided without buffer batteries.

2. A magnetic levitation railway according to claim 1, characterized in that more than two receiver coils (27a, 27b) are assigned to each primary conductor (24).

3. A magnetic levitation railway according to claim 2, characterized in that at least four primary conductors (24) connected to a high-frequency voltage source (26) each are mounted at the guideway (2, 3) and that at least two receiver coils (27a, 27b) are assigned to each primary conductor (24).

4. A magnetic levitation railway according to claim 1, characterized in that at least as many receiver coils (27a, 27b) cooperating with any primary conductor (24) are provided as corresponds to the number of independent onboard networks (16, 16a, 16b) in the magnetic levitation vehicle (1).

5. A magnetic levitation railway according to claim 1, characterized in that the primary conductors (24) extend over the entire length of said guideway (2, 3).

6. A magnetic levitation railway according to claim 1, characterized in that buffer batteries (44), if any, for the vehicle energy are accommodated in the guideway (2, 3) rather than on the vehicle (1).

7. A magnetic levitation railway according to claim 6, characterized in that the buffer batteries (44) are built-in substructures 40 mounted in spaced arrangement along the guideway (2, 3).

8. A magnetic levitation railway comprising a guideway (2, 3), at least one magnetic levitation vehicle (1) and a device for contactless, inductive transmission of electrical energy from said guideway (2, 3) to said vehicle (1), the device comprising:

two receiver coils (27a, 27b) formed by conductor windings and mounted on the vehicle and two primary conductors (24) arranged one above the other and both extending in the longitudinal direction of and mounted at the guideway (2, 3) and connected to a high-frequency alternating voltage source (26), wherein each of the two receiver coils (27a, 27b) mounted at said vehicle (1) are assigned to each of the two primary conductors (24), respectively, and wherein the vehicle is provided without buffer batteries.

* * * * *